United States Patent
Romanovskiy

(10) Patent No.: US 8,214,812 B2
(45) Date of Patent: Jul. 3, 2012

(54) METHOD OF INTERPRETING METHOD BYTECODE AND SYSTEM OPERATED BY THE SAME

(75) Inventor: Alexey Romanovskiy, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1415 days.

(21) Appl. No.: 11/582,360

(22) Filed: Oct. 18, 2006

(65) Prior Publication Data

US 2007/0089101 A1    Apr. 19, 2007

(30) Foreign Application Priority Data

Oct. 18, 2005 (KR) .................. 10-2005-0098159

(51) Int. Cl.
*G06F 9/45* (2006.01)
*G06F 9/455* (2006.01)

(52) U.S. Cl. ............ 717/148; 717/139; 717/150; 718/1; 718/100

(58) Field of Classification Search .................. None
See application file for complete search history.

(56) References Cited

U.S. PATENT DOCUMENTS

| | | | | |
|---|---|---|---|---|
| 6,014,519 A * | 1/2000 | Egashira | ........................ | 717/137 |
| 6,256,784 B1 * | 7/2001 | Grove | .......................... | 717/139 |
| 6,295,643 B1 * | 9/2001 | Brown et al. | .................. | 717/148 |
| 6,546,550 B1 * | 4/2003 | Ogata et al. | .................... | 717/148 |
| 6,988,261 B2 * | 1/2006 | Sokolov et al. | ................ | 717/118 |
| 2002/0104076 A1 * | 8/2002 | Shaylor | ......................... | 717/148 |
| 2004/0088703 A1 * | 5/2004 | Fresko et al. | ................. | 718/100 |
| 2005/0028132 A1 * | 2/2005 | Srinivasamurthy et al. | .. | 717/100 |
| 2005/0160415 A1 * | 7/2005 | Kwon et al. | ................... | 717/151 |

FOREIGN PATENT DOCUMENTS

| | | |
|---|---|---|
| JP | 2001-056764 A | 2/2001 |
| KR | 10-2004-0076048 A | 8/2004 |
| WO | WO 00/34844 A2 | 6/2000 |

* cited by examiner

*Primary Examiner* — Isaac Tecklu
(74) *Attorney, Agent, or Firm* — Sughrue Mion, PLLC

(57) ABSTRACT

A method, a system, and a computer-readable medium storing instructions for interpreting a method bytecode. The method bytecode is interpreted by determining whether a called method is a bottleneck method, generating an interpreter loop for the called method if the called method is the bottleneck method, and interpreting a bytecode of the called method using the generated interpreter loop.

19 Claims, 6 Drawing Sheets

FIG. 2 (RELATED ART)

```
SlowInterpret:
        pc=methodStart();
        bytecode=*pc;
        goto (handler(for(bytecode));
slow_handlers:
        // Execute the slow case bytecodes here
        op-s1:
                execute(op-s1);
                dispatch_next();
        op_s2:
                execute(op_s2);
                dispatch_next();
        ...
        op_sn:
                execute(op_sn);
                dispatch_next();
        // Jump to FastInterpret for any of fast bytecodes
        op-f1:
        op-f2:
        ...
        op-fm:
                FastInterpret(pc);
                dispatch_next();
FastInterpret:
        pc=methodStart();
        bytecode=*pc;
        goto (handler(for(bytecode));
fast_handlers:
        // Execute the fast case bytecodes here
        op-f1:
                execute(op-f1);
                dispatch_next();
        op_f2:
                execute(op_f2);
                dispatch_next();
        ...
        op_fm:
                execute(op_fm);
                dispatch_next();
        // Jump to SlowInterpret for any of slow bytecodes
        op-s1:
        op-s2:
        ...
        op-sn:
                SlowInterpret(pc);
                dispatch_next();
```

METHOD OF INTERPRETING METHOD BYTECODE AND SYSTEM OPERATED BY THE SAME

CROSS-REFERENCE TO RELATED APPLICATIONS

This application claims priority from Korean Patent Application No. 10-2005-0098159 filed on Oct. 18, 2005 in the Korean Intellectual Property Office, the entire disclosure of which is incorporated herein by reference.

BACKGROUND OF THE INVENTION

1. Field of the invention

Methods, systems, and computer-readable mediums consistent with the present invention relate to a virtual machine. More particularly, the present invention relates to interpreting a method bytecode in operation of a virtual machine.

2. Description of the Prior Art

JAVA is an object-oriented programming language developed by Sun Microsystems, Inc. and is defined by the JAVA language standard.

The JAVA virtual machine standard defines a model that can independently execute a JAVA program expressed through an instruction set called bytecode, in a platform.

Bytecode can be generated by a JAVA language compiler that converts a program expressed by a JAVA language.

A JAVA virtual machine executes a predetermined operation by interpreting the bytecode. Such execution of the JAVA virtual machine consumes a small-space resource such as a memory due to the compactness of the bytecode.

However, the performance of the interpreted bytecode becomes lower than that of a program compiled by a native language that can be interpreted directly by a system.

Accordingly, a trade-off between the space required for the execution and the performance attracts attention in development of the JAVA virtual machine. In particular, such a trade-off attracts much attention in development of the JAVA virtual machine based on a platform having a small hardware resource such as an embedded system.

The current trend for improving the performance of the JAVA virtual machine is to provide a compiler that converts a JAVA bytecode into a native code to reduce overhead caused by interpretation of bytecode.

However, since the native code of recent hardware architecture requires a memory space greater than the bytecode, an interpreter is still used if there is limitation in the memory space.

In general, the interpreter has a loop type structure such as "while" statement.

According to "HotSpot JavaVM" technique of Sun Microsystems, Inc. an interpreter loop is generated only once when the operation of the virtual machine starts, i.e., at a time point of "start-up." In this case, as the use of a cache is reduced (cache flush frequently occurs), the performance of the interpreter loop is reduced. In particular, since a smaller processor cache is used for a present embedded architecture, it is more likely that the performance of the interpreter loop is reduced.

Furthermore, according to the prior art, a single interpreter loop is generated before the "VM-build." In this case, since the interpreter loop is dependent upon a specified application known in advance, a problem is caused if another application is loaded.

Meanwhile, U.S. Patent Publication No. 2004-0088703 discloses a method of generating an interpreter having hierarchical loops, as shown in FIG. 1.

First, among bytecodes to be processed by an interpreter, bytecodes frequently executed are identified (S110), and bytecodes not frequently executed are identified (S120).

Afterwards, bytecodes that are simple to execute and bytecodes that are difficult to execute are identified (S130).

If the bytecodes are identified as above, a first interpreter loop is generated to process the bytecodes that are simple to execute and that are frequently executed (S140), and a second interpreter loop is generated to process the other bytecodes (S150).

In other words, not only one interpreter loop but also hierarchical interpreter loops are formed considering the characteristics of the bytecodes. A pseudo-code that executes the bytecodes by using the interpreter having two loops in accordance with the method of FIG. 1 is shown in FIG. 2. However, since the interpreter loops are generated before the "VM-build," there is a problem with dynamically loaded applications.

SUMMARY OF THE INVENTION

Exemplary embodiments of the present invention may overcome the above disadvantages and other disadvantages not described above. The exemplary embodiments of the present invention are not necessarily required to overcome any of the disadvantages described above, and the exemplary embodiments of the present invention may not overcome any of the problems described above. The appended claims should be consulted to ascertain the true scope of the invention.

The present invention provides a method and system which can improve the performance of a bytecode interpretation by analyzing a bytecode of a method frequently called, through a separate loop.

According to an aspect, of the present invention, there is provided a method of interpreting a method bytecode, which includes determining whether a called method is a bottleneck method, generating an interpreter loop for the called method if the called method is the bottleneck method, and interpreting a bytecode of the called method using the generated interpreter loop.

According to another aspect of the present invention, there is provided a method of interpreting a method bytecode, which includes determining whether a called method is a bottleneck method, providing an associated interpreter loop for the called method if the called method is the bottleneck method, and interpreting a bytecode of the called method using the provided interpreter loop.

In still another aspect of the present invention, there is provided a system for interpreting a method bytecode, which includes an operating system, an application, and a virtual machine, which is based on the operating system, provides an interface for the application, and interprets a bytecode of a method called from the application so as to convert the interpreted bytecode into a code that can be recognized by the operating system, wherein the virtual machine interprets the bytecode of the called method using an interpreter loop associated with the called method if the called method is a bottleneck method.

According to another aspect of the present invention, there is provided a computer-readable medium storing instructions for interpreting a method bytecode, the instructions comprising determining whether a called method is a bottleneck method, generating an interpreter loop for the called method if the called method is the bottleneck method, and interpreting a bytecode of the called method using the generated interpreter loop.

BRIEF DESCRIPTION OF THE DRAWINGS

The above and other aspects of the present invention will be more apparent from the following detailed description of exemplary embodiments of the present invention taken in conjunction with the accompanying drawings, in which:

FIG. 2 is a view illustrating an example of a pseudo-code that executes bytecodes according to the related art;

DETAILED DESCRIPTION OF THE EXEMPLARY EMBODIMENTS

Figure 1:
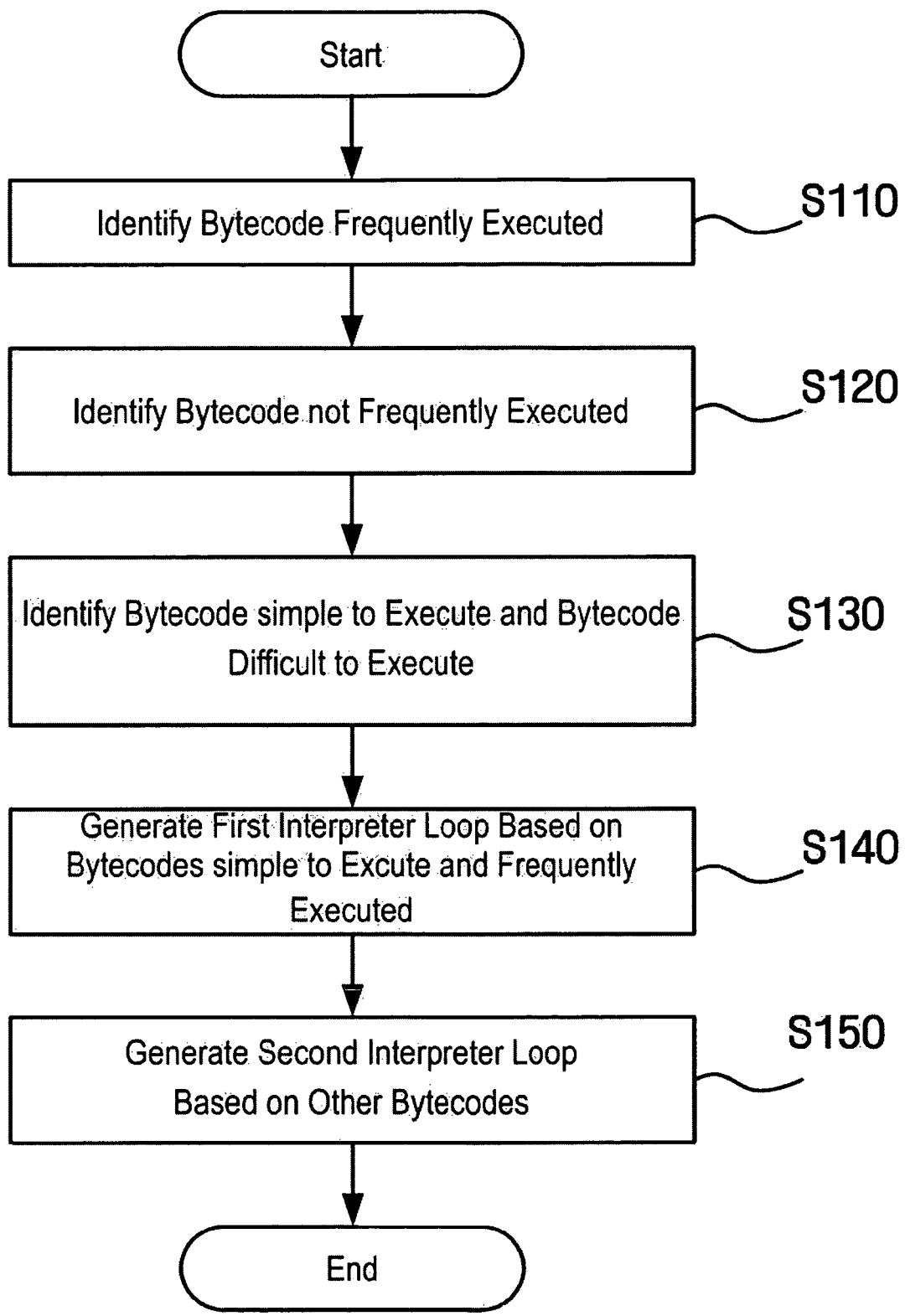
FIG. 1 is a flowchart illustrating a process of generating an interpreter loop according to the related art.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings.

However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the exemplary embodiments of the present invention, the same drawing reference numerals are used for analogous elements across various figures.

The exemplary embodiments of the present invention will be described herein with reference to the accompanying drawings. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In the exemplary embodiments of the present invention, the term "unit", that is, "module" or "table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

Figure 3:
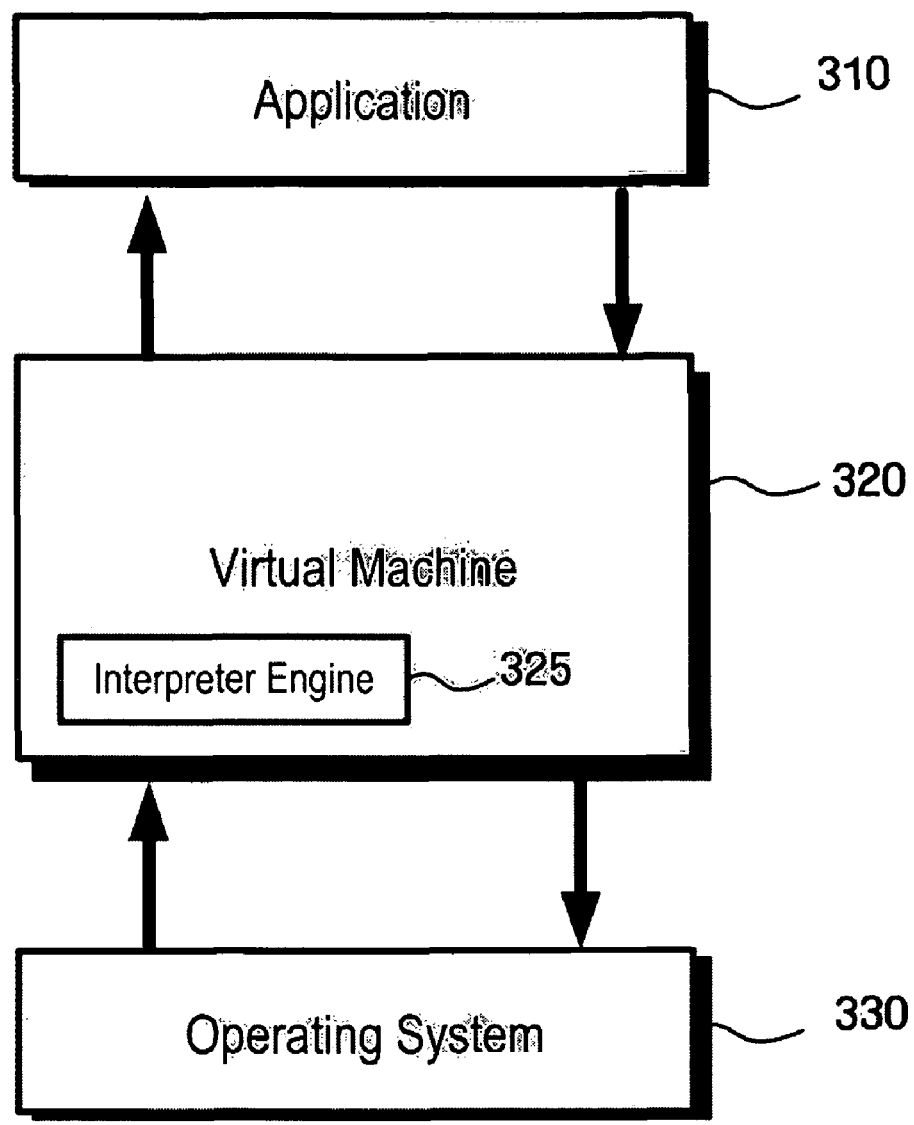
FIG. 3 is a block diagram illustrating the configuration of a system according to an exemplary embodiment of the present invention.

FIG. 3 is a block diagram illustrating configuration of a system according to an exemplary embodiment of the present invention.

Referring to FIG. 3, the system 300 includes an operating system 330, a virtual machine 320, and an application 310.

The operating system 330 manages the operation of the whole system such as UNIX and WINDOWS and processes information. One of ordinary skill in the art would readily understand that the present invention is not limited to a specified operating system and other known or future developed operation systems are within the scope of the present invention.

The virtual machine 320 is operated based on the operating system, and provides an application program interface (API) based on the virtual machine to allow a developer to develop a program using the API without considering the type of the operating system 330.

Furthermore, the virtual machine 320 interprets a bytecode to convert the bytecode into a native code that can be recognized by the operating system 330. In particular, the virtual machine 320 forms an interpreter loop for interpreting the bytecode in accordance with characteristics of a method. To this end, the virtual machine 320 includes an interpreter engine 325.

A JAVA virtual machine is described as an example of the virtual machine according to an exemplary embodiment of the present invention. One of ordinary skill in the art would readily understand that the present invention is not limited to a JAVA virtual machine and other known or future developed technologies are within the scope of the present invention.

The application 310 is a program module that executes a specified operation, wherein the developer can prepare the application 310 using the API provided by the virtual machine 320. A JAVA application will be described as an example of the application according to an exemplary embodiment of the present invention. One of ordinary skill in the art would readily understand that the present invention is not limited to a JAVA application and other known or future developed applications are within the scope of the present invention.

Figure 4:
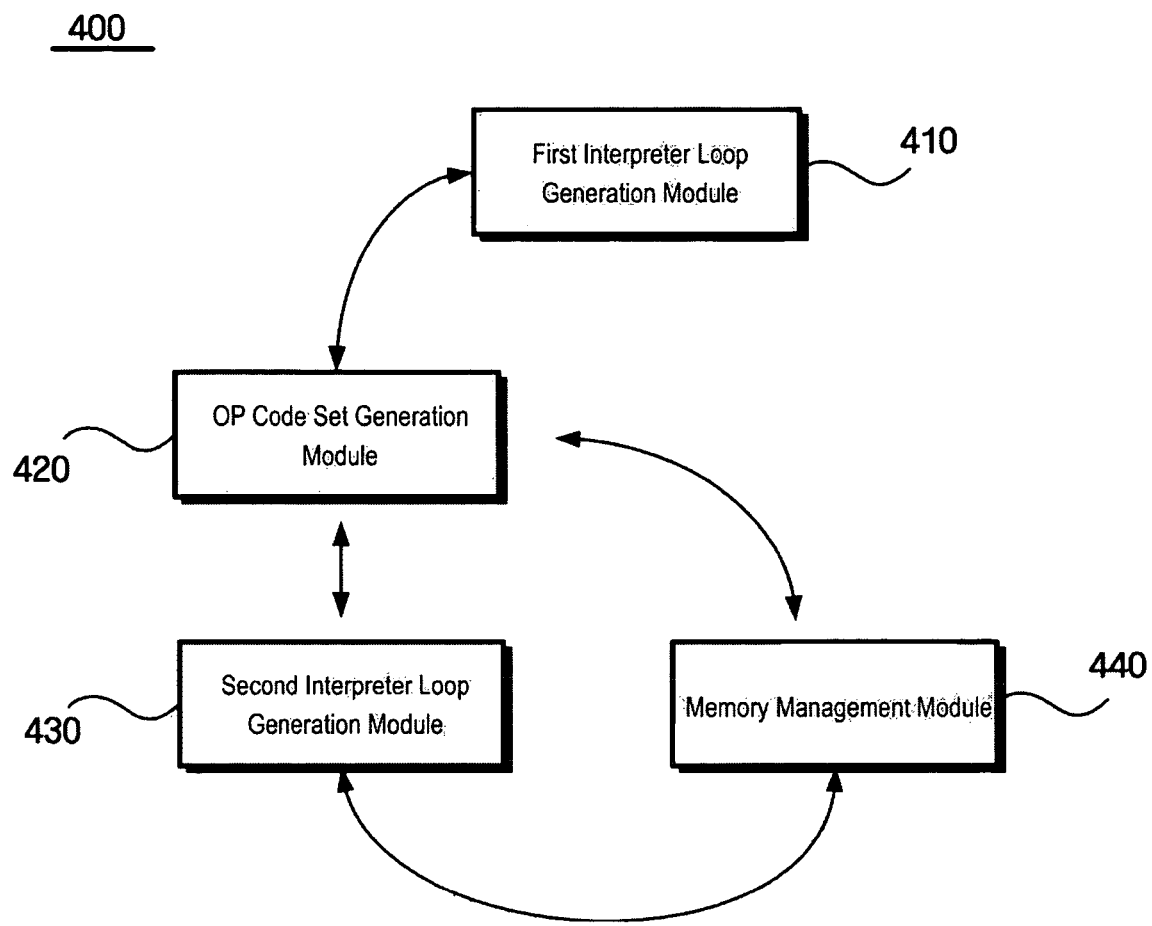
FIG. 4 is a block diagram illustrating the construction of an interpreter engine according to an exemplary embodiment of the present invention.

FIG. 4 is a block diagram illustrating a structure of the interpreter engine according to an exemplary embodiment of the present invention.

Referring to FIG. 4, the interpreter engine 400 includes a first interpreter loop generation module 410, an operation (OP) code set generation module 420, a second interpreter loop generation module 430, and a memory management module 440.

The first interpreter loop generation module 410 generates a primary interpreter loop. The primary interpreter loop can interpret any method whatever the method is i.e., regardless of the type of the method. The primary interpreted loop determines whether the method is a bottleneck method. The bottleneck method is a method frequently used and may also be called a "hot method".

The primary interpreter loop includes logic that determines and predicts what method is a bottleneck method. In other words, it can be understood that the first interpreter loop generation module 410 provides a function of selecting a bottleneck method. At this time, the logic may also include the number of times the method is called.

For example, if a JAVA method is called, the number of times the method is called, stored in each method data structure, is increased or decreased. Then, if a value corresponding to the number of times the method is called reaches a threshold value, the corresponding method may be regarded as a bottleneck method. In this case, the number of times the method is called is used to determine whether the corresponding method is the bottleneck method. One of ordinary skill in the art will appreciate that using the number of times the method is called to determine if the method is a bottleneck method is provided by way of an example only and not by way of a limitation. Other determining method currently known or later developed are within the scope of the invention.

On the other hand, the interpreter engine 400 allows each interpreted method to associate with its interpretation loop routine. Such association may be executed by a callback mechanism. Each method initially associates with a routine of the primary interpreter loop.

The OP code set generation module 420 generates an OP code set for a method bytecode. At this time, it is preferable that the bytecode is for a bottleneck method.

If the bytecode for a bottleneck method is given, an empty OP code set is generated. The empty OP code set is filled with an OP code found in the given bytecode for a bottleneck method.

At this time, the data structure of the OP code set may be optimized by executing binary comparison operation to determine whether the OP code set is included in another OP code set or executing binary comparison operation to identify the difference between two OP code sets.

The second interpreter loop generation module 430 generates an interpreter loop for a given OP code set. Hereinafter, "interpreter loop" will mean the interpreter loop generated by the second interpreter loop generation module 430 if no specific description is made. In this case, the interpreter loop may be generated by two modes.

The first mode is to generate an interpreter loop for all the OP codes of the given OP code set while the second mode is to generate an OP code handler and update the generated interpreter loop using the OP code handler.

The memory management module 440 manages memory blocks that include codes for the interpreter loop generated by the second interpreter loop generation module 430.

The memory blocks assigned by the memory management module 440 have the same size as one another to be optimized by a processor code cache.

If the OP code set is given, the memory management module 440 determines how many memory spaces are occupied by the generated OP code. At this time, the memory management module 440 is operated along with the second interpreter loop generation module 430.

If the memory management module 440 is required to vacate one memory block, it selects one among memory blocks in which the generated interpreter loop codes are written. At this time, the standard of selecting the memory block is to select the memory block that minimizes performance overhead caused by use of the primary interpreter loop instead of the interpreter loop generated by the second interpreter loop generation module 430.

The memory management module 440 arranges the codes of the interpreter loop generated in the selected memory block, and again associates all the dependent methods with either the primary interpreter loop or one of previously generated interpreter loops. At this time, the memory management module 440 can again associate all the dependent methods with one of previously generated interpreter loops when the generated interpreter loops have the same OP code set or the arranged OP code set of the interpreter loop has a lower level than an OP code set of another interpreter loop.

Figure 5:
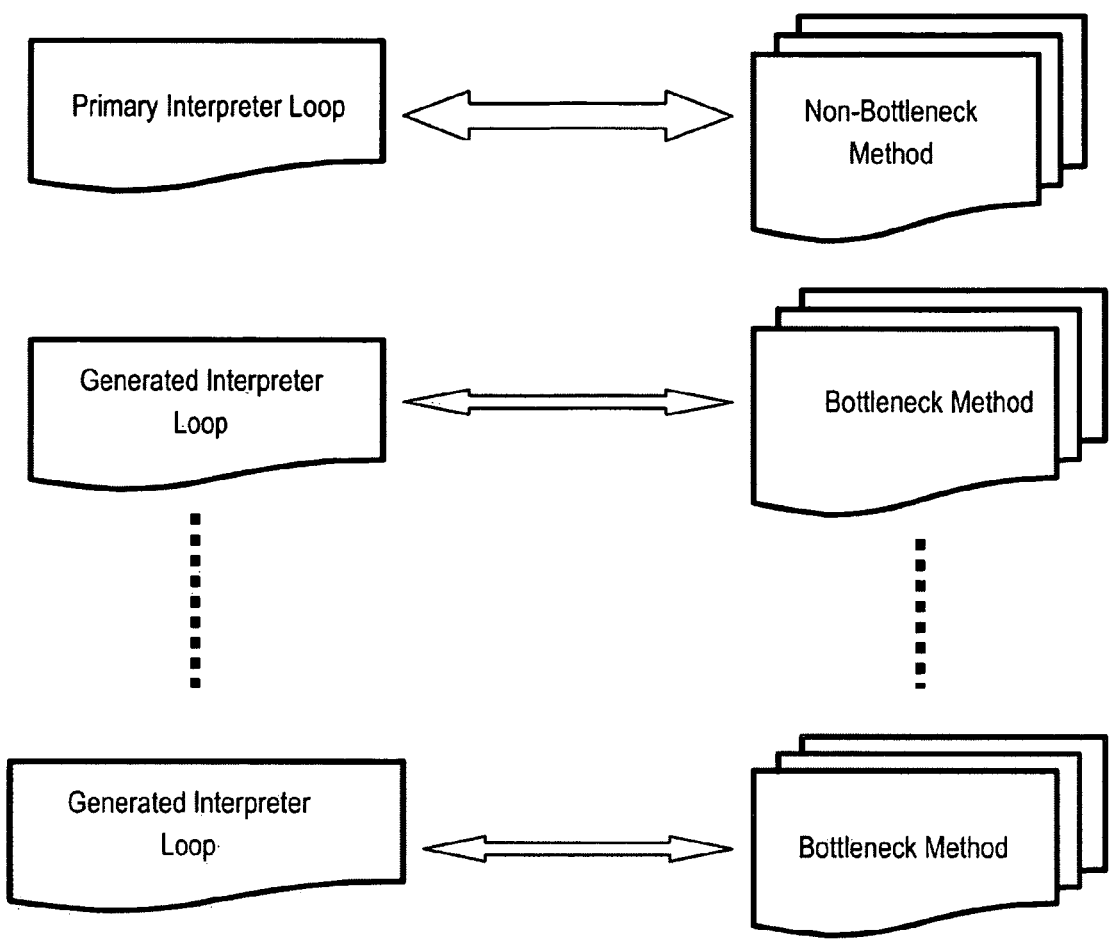
FIG. 5 is an exemplary view illustrating relationship between a method and an interpreter loop according to an exemplary embodiment of the present invention.

FIG. 5 is an exemplary view illustrating relationship between the method and the interpreter loop according to an exemplary embodiment of the present invention. A non-bottleneck method associates with the primary interpreter loop while the bottleneck method associates with the interpreter loop generated by the second interpreter loop generation module 430. In this case, a single interpreter loop can associate with a plurality of bottleneck methods.

Figure 6:
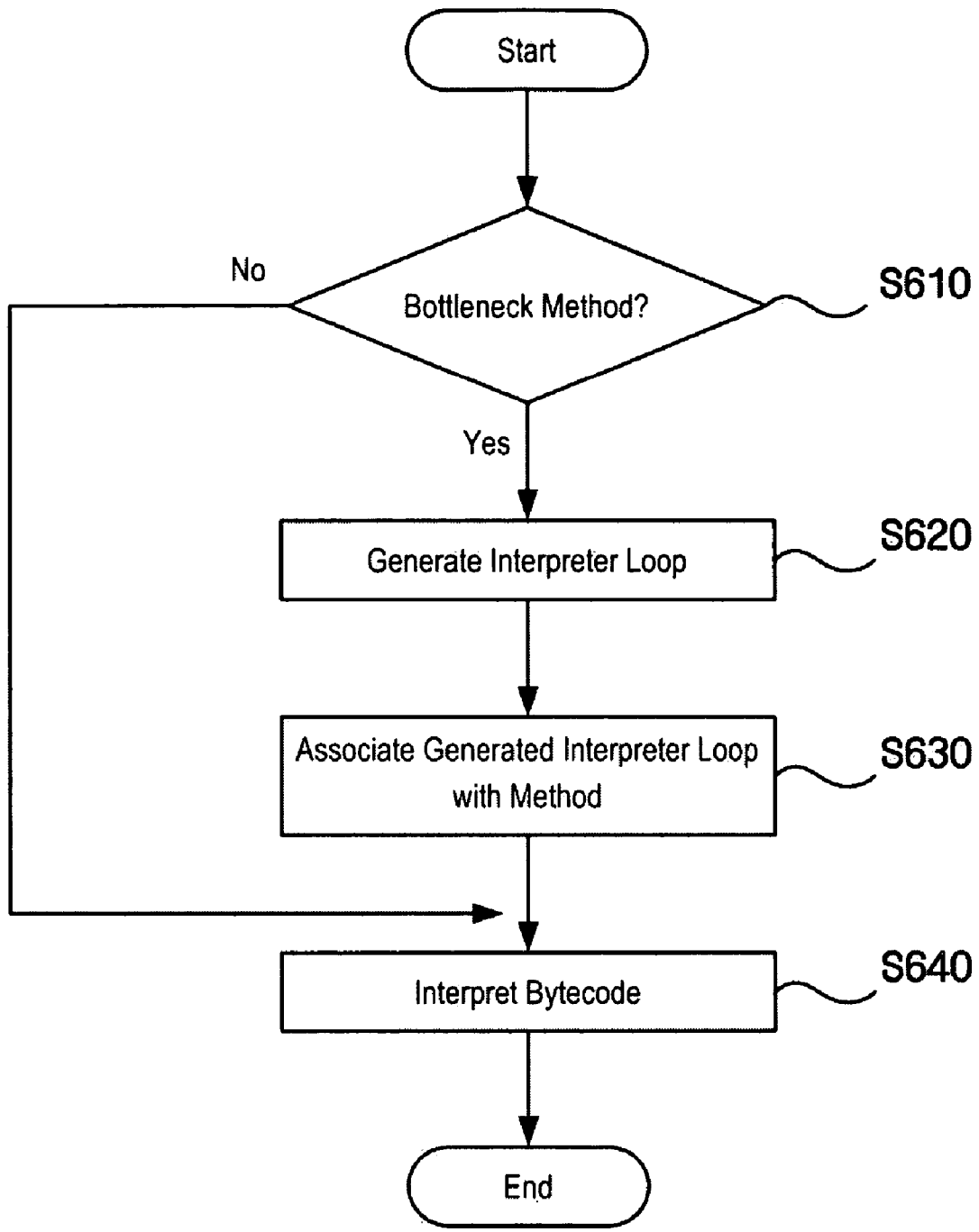
FIG. 6 is a flowchart illustrating a process of interpreting a method according to an exemplary embodiment of the present invention.

FIG. 6 is a flowchart illustrating a process of interpreting the method according to an exemplary embodiment of the present invention.

First, the interpreter engine 400 determines whether a currently called method is a bottleneck method (S610). If the currently called method is not the bottleneck method, the interpreter engine 400 interprets the bytecode using the primary interpreter loop (S640).

However, if it is determined that the currently called method is the bottleneck method in operation S610, the interpreter engine 400 generates the interpreter loop corresponding to the called method S620 and associates the generated interpreter loop with the called method (S630).

Then, the interpreter engine 400 interprets the bytecode of the called method using the generated interpreter loop (S640).

Although not shown in FIG. 6, if the called method associates with a predetermined interpreter loop, the interpreter engine 400 may interpret the bytecode using the associated interpreter loop.

Finally, it is possible to improve the interpretation performance of the bytecode for the bottleneck method by interpreting the bytecode through a separate interpreter loop without using the primary interpreter loop.

As described above, in the method of interpreting a method bytecode in operation of a virtual machine and a system operated by the method according to an exemplary embodiment of the present invention, it is possible to improve performance of the interpreter under the virtual machine environment.

The exemplary embodiments of the present invention have been described for illustrative purposes only, and those skilled in the art will appreciate that various modifications, additions and substitutions are possible without departing from the scope and spirit of the invention as disclosed in the accompanying claims. Therefore, the scope of the present invention should be defined by the appended claims and their equivalents.

What is claimed is:

1. A computer-implemented method of interpreting a method bytecode, comprising:
   determining whether a called method is a bottleneck method;
   generating an interpreter loop for the called method if the called method is determined to be the bottleneck method; and
   interpreting a bytecode of the called method using the generated interpreter loop;
   wherein no interpreter loop is generated until after a virtual machine comprising a primary interpreter loop is built, wherein the determining whether a called method is a bottleneck method is determined by the primary interpreter loop.

2. The computer-implemented method of claim 1, wherein the determining comprises determining the called method based on number of times the called method is called.

3. The computer-implemented method of claim 1, wherein the generating comprises associating the generated interpreter loop with the called method.

4. The computer-implemented method of claim 1, wherein the generating comprises:
   generating a predetermined operation code handler for the called method; and
   updating a previously generated interpreter loop using the generated operation code handler.

5. The computer-implemented method of claim 1, wherein the generating comprises:
   generating an operation code set of the called method if the called method is the bottleneck method; and
   generating the interpreter loop for the called method based on the generated operation code set.

6. The method of claim 1, wherein if the called method is not a bottleneck method, associating the called method with the primary interpreter loop without generating the interpreter loop for the called method and interpreting the bytecode of the called method using the primary interpreter loop.

7. The method of claim 6, wherein if an interpreter loop was previously generated for the bottleneck method, associating the previously generated interpreter loop for the called method without generating the interpreter loop.

8. A computer-implemented method of interpreting a method bytecode, comprising:
   determining whether a called method is a bottleneck method;
   providing an associated interpreter loop for the called method if the called method is determined to be the bottleneck method; and
   interpreting a bytecode of the called method using the provided interpreter loop;
   wherein no interpreter loop is generated until after a virtual machine comprising a primary interpreter loop is built, wherein the determining whether a called method is a bottleneck method is determined by the primary interpreter loop.

9. The computer-implemented method of claim 8, wherein the determining comprises determining the called method based on a number of times the called method is called.

10. A system implemented by a computer for interpreting a method bytecode, the system comprising:
    a processor for interpreting the method bytecode;
    an operating system;
    an application; and
    a virtual machine, which is based on the operating system, provides an interface for the application, and interprets a bytecode of a method called from the application to convert the interpreted bytecode into a code recognizable by the operating system, the virtual machine comprising a primary interpreter loop;
    wherein the virtual machine interprets the bytecode of the called method using an interpreter loop associated with the called method if the called method is a bottleneck method;
    wherein no interpreter loop is generated until after the virtual machine is built, wherein the determining whether a called method is a bottleneck method is determined by the primary interpreter loop.

11. The system of claim 10, wherein whether the called method is the bottleneck method is determined based on a number of times the called method is called.

12. The system of claim 10, wherein the virtual machine is used by generating the interpreter loop for the called method.

13. The system of claim 10, wherein the virtual machine generates a predetermined operation code handler for the called method, and updates a previously generated interpreter loop using the generated operation code handler to generate the interpreter loop for the called method.

14. The system of claim 10, wherein the virtual machine generates an operation code set of the called method if the called method is the bottleneck method, and generates the interpreter loop for the called method based on the generated operation code set.

15. A computer-readable medium storing instructions for interpreting a method bytecode, the instructions comprising:
    determining whether a called method is a bottleneck method;
    generating an interpreter loop for the called method if the called method is the bottleneck method; and
    interpreting a bytecode of the called method using the generated interpreter loop;
    wherein no interpreter loop is generated until after a virtual machine comprising a primary interpreter loop is built, wherein the determining whether a called method is a bottleneck method is determined by the primary interpreter loop.

16. The computer-readable medium of claim 15, wherein the determining comprises determining the called method based on number of times the called method is called.

17. The computer-readable medium of claim 15, wherein the generating comprises associating the generated interpreter loop with the called method.

18. The computer-readable medium of claim 15, wherein the generating comprises:
    generating a predetermined operation code handler for the called method; and
    updating a previously generated interpreter loop using the generated operation code handler.

19. The computer-readable medium of claim 15, wherein the generating comprises:
    generating an operation code set of the called method if the called method is the bottleneck method; and
    generating the interpreter loop for the called method based on the generated operation code set.

* * * * *